United States Patent Office 3,468,940
Patented Sept. 23, 1969

3,468,940
DIPHENETHYLBENZENE TETRACARBOXYLIC
ACID DERIVATIVES
Ferdinand B. Zienty, Warson Woods, and Myron J. Helm,
Olivette, Mo., assignors to Monsanto Company, St.
Louis, Mo., a corporation of Delaware
No Drawing, Original application June 5, 1964, Ser. No.
373,065, now Patent No. 3,293,278, dated Dec. 20,
1966. Divided and this application Mar. 24, 1966, Ser.
No. 537,025
Int. Cl. C07c 63/48
U.S. Cl. 260—515                                    2 Claims

ABSTRACT OF THE DISCLOSURE

Certain derivatives of diphenethylbenzene-$\alpha,\alpha',\beta,\beta'$-tetracarboxylic acid are valuable as synthetic resin intermediates to prepare plasticizers, flame-proofing agents, gear oil additives, high temperature grease additives, fungicides and bacteriostats.

---

The present application is a division of our copending application, Ser. No. 373,065, filed June 5, 1964, now U.S. Patent 3,293,278, granted Dec. 20, 1966.

This invention relates to new chemical compounds and particularly to derivatives of diphenethylbenzene tetracarboxylic acids. These compounds which exhibit utility as synthetic resin intermediates are characterized by the following structural formula:

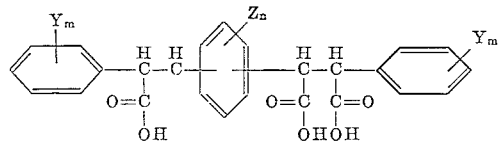

Y is a monovalent substituent selected from the group consisting of alkyl, aryl and aryloxy radicals, alkoxy radicals containing from 1 to 18 carbon atoms, nitro radicals, halogens and secondary and tertiary amino radicals, Z is a monovalent substituent selected from the group consisting of methyl radicals and halogens, $m$ is a cardinal number from 0 to 5 inclusive, and $n$ is a cardinal number from 0 to 4 inclusive.

Tetracyanodiphenethylbenzene, the parent compound of the present invention, can be prepared by the condensation of a benzenediacetonitrile with a benzaldehyde to form dibenzylidenebenzenediacetonitrile followed by cyanation of the dibenzylidenebenzenediacetonitrile. The condensation and cyanation can be conducted in a one-step operation, or the introduction of the additional nitrile groups can be deferred until the condensation is complete. The tetracyanodiphenethylbenzene thus obtained is then hydrolyzed to the tetracarboxylic acid of diphenethylbenzene.

As indicated above, benzaldehyde can be used in the preparation of the present invention. However, in the preparation of compounds having substituents on the terminal benzene rings, it is preferred to use substituted benzaldehydes rather than to add the substituents after the condensation reaction. Specific examples of substituted benzaldehydes that can be employed include methylbenzaldehydes, ethylbenzaldehydes, propylbenzaldehydes, butylbenzaldehydes, decylbenzaldehydes, dodecylbenzaldehydes, octylbenzaldehydes, methoxybenzaldehydes, ethoxybenzaldehydes, propoxybenzaldehydes, butoxybenzaldehydes, nonoxybenzaldehydes, undecoxybenzaldehydes, octadecoxybenzaldehydes, phenylbenzaldehydes, tolylbenzaldehydes, phenoxybenzaldehydes, toloxybenzaldehydes, nitrobenzaldehydes, chlorobenzaldehydes, fluorobenzadehydes, bromobenzaldehydes, iodobenzaldehydes, nitrohalobenzaldehydes, alkylhalobenzaldehydes, alkoxyhalobenzaldehydes, aroxyhalobenzaldehydes, alkylnitrobenzaldehydes, alkylnitrohalobenzaldehydes and the like.

The substituents on the benzaldehyde nucleus can vary in number from one through five, be like or unlike, and members of the groups indicated hereinbefore.

The benzenediacetonitrile to be condensed with the benzaldehyde may be ortho, meta or para, substituted or unsubstituted. Suitable benzenediacetonitrile include mono-, di-, tri-, and tetra-methylbenzenediacetonitriles, mono-, di-, tri- and tetra-chlorobenzenediacetonitriles, mono-, di-, tri- and tetra-fluorobenzenediacetonitriles, mono-, di, tri- and tetra-bromobenzenediacetonitriles, and mono-, di-, tri- and tetra-iodobenzenediacetonitriles. Mixed halobenzenediacetonitriles and methylhalobenzenediacetonitriles may also be employed. Examples of suitable benzenediacetonitriles of these groups include chlorofluoro-, chlorobromo-, chloroiodo-, fluorobromo-, fluoroiodo-, bromochloro-, bromoiodo-, chlorobromoiodo-, methylchloro-, methylfluoro-, methyliodo, methylbromobenzenediacetonitriles and the like.

The invention will be further clarified by reference to the following detailed descriptions of the preparation of compounds encompassed thereby. Unless otherwise specified, all proportions in these examples and throughout the specification are expressed in parts by weight.

Example 1.—p-Diphenethylbenzene-$\alpha,\alpha',\beta,\beta'$-tetracarboxylic acid In a 1 liter beaker equipped with a vigorous stirrer there were placed about 53 g. of redistilled benzaldehyde, about 39 g. of p-benzenediacetonitrile, and 325 ml. of 95% ethanol. The mixture was warmed to dissolve the reactants, then allowed to cool to 45° C. Sodium ethoxide was prepared by adding 1.2 g. of sodium to 25 ml. of ethanol, and this alkali solution was added dropwise to the stirred reaction mixture. After 7 ml. of the alkali had been added, a precipitate formed rapidly which transformed the reaction mixture to a thick paste. Stirring and addition of alkali were stopped, the mixture was cooled to room temperature, and the precipitate was collected by filtration. After washing with a mixture of water and ethanol, the material is recrystallized from acetonitrile. 33.2 g. of the product was transferred to a 3 liter flask equipped with a stirrer, a reflux condenser, and a dropping funnel. There is added 1 liter of triethylamine and 1 liter of methanol. A solution of 24.5 g. of sodium cyanide in 40 ml. of warm water was then added rapidly to the stirred, boiling nitrile suspension, followed by a solution of 11.5 ml. of acetic acid in 90 ml. of methanol to hold the color to a pale red hue. (In the absence of added acetic acid, the mixture approaches a deep fuchsia.) After 1.5 hours an additional 5 ml. of acetic acid was added, and the very pale pink solid, $\alpha,\alpha',\beta,\beta'$-tetracyano-p-diphenethylbenzene, was filtered from the hot liquors, washed twice with 200 ml. portions of methanol and twice with 200 ml. portions of water.

To a mixture of 50 g. of $\alpha,\alpha',\beta,\beta'$-tetracyano-p-diphenethylbenzene and 112.5 ml. of water there is added 956 ml. of concentrated sulfuric acid. By swirling and warming to 80–90° C. the nitrile was dissolved. The solution was allowed to stand at room temperature for 3 hours and then it was diluted with about 540 ml. of water. This mixture was held at 120° for 8 hours, and then allowed to cool. The solid which separated was collected, washed, and dissolved in dilute ammonium hydroxide. This dark solution was decolorized by passing through a column of decolorizing carbon. The pale yellow percolate was heated and stirred with 10 ml. of acetic acid. Then 40 ml. of concentrated hydrochloric acid was added. The white precipitate which formed was collected, washed thoroughly with water, and dried. This material melted well over 300° C.

*Analysis.*—Calcd. for $C_{26}H_{22}O_8$ (462.44): C, 67.53; H, 4.80; neut. eq., 115.61. Found: C, 65.74; H, 5.53; 5.00; neut. eq., 124.

Evaporation of the mother liquors allowed recovery of an additional 0.4 of tan solid with the same neutral equivalent.

Similarly, other diphenethylbenzene tetracarboxylic acids can be prepared by the hydrolysis of tetracyanodiphenethylbenzenes having the desired substituents on one or more of their benzene rings. Suitable tetracyanodiphenethylbenzenes that can be thus hydrolyzed include, for instance, those obtained in accordance with Examples 2 through 22 where equivalent amounts of benzaldehydes (II) and benzene diacetonitriles (III) are reacted to yield various $\alpha,\alpha',\beta,\beta'$-tetracyanodiphenethylbenzenes (I).

Examples

2 ........... (I) $\alpha,\alpha',\beta,\beta'$-tetracyano-o-diphenethylbenzene
 (II) benzaldehyde
 (III) o-benzenediacetonitrile
3 ........... (I) $\alpha,\alpha',\beta,\beta'$-tetracyano-m-diphenethylbenzene
 (II) benzaldehyde
 (III) m-benzenediacetonitrile
4 ........... (I) 4,4″-dimethyl-$\alpha,\alpha',\beta,\beta'$-tetracyano-p-diphenethylbenzene
 (II) 4-methylbenzaldehyde
 (III) p-benzenediacetonitrile
5 ........... (I) 2,2″-dimethyl-$\alpha,\alpha',\beta,\beta'$-tetracyano-p-diphenethylbenzene
 (II) 2-methylbenzaldehyde
 (III) p-benzenediacetonitrile
6 ........... (I) 3,3″-dimethyl-$\alpha,\alpha',\beta,\beta'$-tetracyano-p-diphenthylbenzene
 (II) 3-methylbenzaldehyde
 (III) p-benzenediacetonitrile
7 ........... (I) 4,4″-dioctadecyl-$\alpha,\alpha',\beta,\beta'$-tetracyano-p-diphenethylbenzene
 (II) 4-octadecylbenzaldehyde
 (III) p-benzenediacetonitrile
8 ........... (I) 4,4″-dimethoxy-$\alpha,\alpha',\beta,\beta'$-tetracyano-p-diphenethylbenzene
 (II) 4-methoxybenzaldehyde
 (III) p-benzenediacetonitrile
9 ........... (I) 2,2″-dimethoxy-$\alpha,\alpha',\beta,\beta'$-tetracyano-p-diphenethylbenzene
 (II) 2-methoxybenzaldehyde
 (III) p-benzenediacetonitrile
10 .......... (I) 3,3″-dimethoxy-$\alpha,\alpha',\beta,\beta'$-tetracyano-p-diphenethylbenzene
 (II) 3-methoxybenzaldehyde
 (III) p-benzenediacetonitrile
11 .......... (I) 4,4″-dioctadecoxy-$\alpha,\alpha',\beta,\beta'$-tetracyano-p-diphenethylbenzene
 (II) 4-octadecoxybenzaldehyde
 (III) p-benzenediacetonitrile
12 .......... (I) 4,4″-diphenyl-$\alpha,\alpha',\beta,\beta'$-tetracyano-p-diphenethylbenzene
 (II) 4-phenylbenzaldehyde
 (III) p-benzenediacetonitrile
13 .......... (I) 4,4″-diphenoxy-$\alpha,\alpha',\beta,\beta'$-tetracyano-p-diphenethylbenzene
 (II) 4-phenoxybenzaldehyde
 (III) p-benzenediacetonitrile
14 .......... (I) 3,3″-dinitro-$\alpha,\alpha',\beta,\beta'$-tetracyano-p-diphenethylbenzene
 (II) m-nitrobenzaldehyde
 (III) p-benzenediacetonitrile
15 .......... (I) 3,3″-dichloro-$\alpha,\alpha',\beta,\beta'$-tetracyano-p-diphenethylbenzene
 (II) m-chlorobenzaldehyde
 (III) p-benzenediacetonitrile
16 .......... (I) 2′-methyl-$\alpha,\alpha',\beta,\beta'$-tetracyano-p-diphenethylbenzene
 (II) benzaldehyde
 (III) 2-methyl-p-benzenediacetonitrile
17 .......... (I) 2′-chloro-$\alpha,\alpha',\beta,\beta'$-tetracyano-p-diphenethylbenzene
 (II) benzaldehyde
 (III) 2-chloro-p-benzenediacetonitrile
18 .......... (I) 2′,3′,5′,6′-tetrachloro-$\alpha,\alpha',\beta,\beta'$-tetracyano-p-diphenethylbenzene
 (II) benzaldehyde
 (III) 2,3,5,6-tetrachlorobenzene-1,4-diacetonitrile
19 .......... (I) 3,4,3″,4″-tetramethoxy-$\alpha,\alpha',\beta,\beta'$-tetracyano-p-diphenethylbenzene
 (II) veratraldehyde (3,4-dimethoxybenzaldehyde)
 (III) p-benzenediacetonitrile
20 .......... (I) 2′-nitro-$\alpha,\alpha',\beta,\beta'$-tetracyano-p-diphenethylbenzene
 (II) benzaldehyde
 (III) 2-nitro-p-benzenediacetonitrile
21 .......... (I) 3,3″-dinitro-4,4″-dimethyl-$\alpha,\alpha',\beta,\beta'$-tetracyano-m-diphenethylbenzene
 (II) 3-nitro-4-methylbenzaldehyde
 (III) m-benzenediacetonitrile
22 .......... (I) 3,3′,3″-trinitro-$\alpha,\alpha',\beta,\beta'$-tetracyano-p-diphenethylbenzene
 (II) m-nitrobenzaldehyde
 (III) 2-nitro-p-benzenediacetonitrile It is self-evident that the various substituted tetracarboxylic acids thus obtained can be utilized in the preparation of the corresponding esters, anhydrides, imides, carboxamides and mixed ester-carboxamides.

The compounds produced in accordance with the present invention are crystalline compounds of moderate molecular weight. They are insoluble in water, but readily soluble in a variety of commercially available solvents. They are of particular value as resin intermediates, and also as (intermediates in the preparation of) plasticizers, flame proofing agents, gear oil additives, high temperature grease additives, fungicides and in numerous other industrial applications. In addition a number of the compounds under consideration exhibit bacteriostatic properties. For example, p-diphenethylbenzene-$\alpha,\alpha',\beta,\beta'$-tetracarboxylic acid possesses inherent antibacterial activity against *Salmonella typhosa*. These products are particularly valuable since they present a series of compounds in which the melting point can be varied while the chemical characteristics are maintained substantially constant. High melting products are obtained by using the para form of benzene diacetonitrile as the starting material, whereas the ortho and meta benzene diacetonitriles yield lower melting products.

The tetracarboxylic acids of the present invention can be esterified with alcohols, such as glycerine, pentaerythritol, sorbitol, mannitol, ethylene glycol and the like in the preparation of polyester and alkyl resins having high softening points and film-forming properties.

Numerous modifications and additional compounds will readily suggest themselves to those skilled in the art. Thus, while the invention has been described with particular reference to specific embodiments, it is to be understood that it is not to be limited thereto but is to be construed broadly and restricted solely by the scope of the appended claims.

The embodiments of the invention in which an exclusive property or privilege is claimed are defined as follows:

1. A diphenethylbenzene-$\alpha,\alpha',\beta,\beta'$-tetracarboxylic acid of the formula

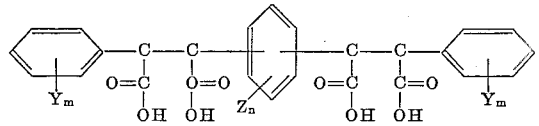

wherein Y is a monovalent substituent selected from the group consisting of phenyl, tolyl, phenoxy, tolyloxy, alkyl or alkoxy each having up to 18 carbon atoms, nitro and halogen; Z is methyl or halogen; $m$ is a cardinal number from 0 to 5 inclusive; and $n$ is a cardinal number from 0 to 4 inclusive.

2. p-Diphenethylbenzene-$\alpha,\alpha',\beta,\beta'$-tetracarboxylic acid.

No references cited.

LORRAINE A. WEINBERGER, Primary Examiner

M. G. BERGER, Assistant Examiner

U.S. Cl. X.R.

260—520

PO-1050
(5/69)

UNITED STATES PATENT OFFICE
CERTIFICATE OF CORRECTION

Patent No. 3,468,940      Dated September 23, 1969

Inventor(s) Ferdinand B. Zienty and Myron J. Holm

It is certified that error appears in the above-identified patent and that said Letters Patent are hereby corrected as shown below:

Column 1, lines 36 to 40, that portion of the formula

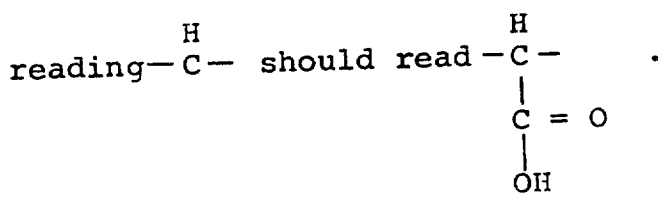

SIGNED AND
SEALED

JUL 14 1970

(SEAL)
Attest:

Edward M. Fletcher, Jr.
Attesting Officer

WILLIAM E. SCHUYLER, JR.
Commissioner of Patents